United States Patent
Grimm

(10) Patent No.: US 8,274,267 B2
(45) Date of Patent: *Sep. 25, 2012

(54) HYBRID POWER CONVERTER

(75) Inventor: Michael Grimm, Los Altos Hills, CA (US)

(73) Assignee: Silergy Technology, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/247,092

(22) Filed: Sep. 28, 2011

(65) Prior Publication Data

US 2012/0019220 A1    Jan. 26, 2012

Related U.S. Application Data

(63) Continuation of application No. 12/313,457, filed on Nov. 20, 2008, now Pat. No. 8,067,925.

(51) Int. Cl.
*G05F 1/40*    (2006.01)
(52) U.S. Cl. .................... 323/274; 323/272; 323/282
(58) Field of Classification Search .......... 323/266–268, 323/271–275, 282–288, 280; 307/66, 80, 307/110, 140; 363/16–17, 65, 89, 97
See application file for complete search history.

(56) References Cited

U.S. PATENT DOCUMENTS

| | | | |
|---|---|---|---|
| 4,618,812 A * | 10/1986 | Kawakami | 323/224 |
| 4,713,742 A * | 12/1987 | Parsley | 363/124 |
| 5,481,178 A | 1/1996 | Wilcox | |
| 5,731,694 A | 3/1998 | Wilcox | |
| 6,304,066 B1 | 10/2001 | Wilcox | |
| 6,396,252 B1 * | 5/2002 | Culpepper et al. | 323/285 |
| 6,580,258 B2 | 6/2003 | Wilcox | |
| 7,292,016 B2 * | 11/2007 | Wake | 323/271 |
| 7,609,039 B2 | 10/2009 | Hasegawa | |
| 2005/0007080 A1 * | 1/2005 | Wake | 323/271 |
| 2007/0057658 A1 * | 3/2007 | Hasegawa | 323/282 |
| 2007/0069703 A1 * | 3/2007 | Kokubun et al. | 323/282 |

OTHER PUBLICATIONS

On Semiconductor, MC34063 Data Sheet, Feb. 2007, obtainable at: http://onsemi.com.
Micrel, MIC2205 Data Sheet, Mar. 2005, obtainable at: http://micrel.com.
Linear Technology, LTC1735 Data Sheet, obtainable at: http://linear.com.

* cited by examiner

*Primary Examiner* — Rajnikant Patel
(74) *Attorney, Agent, or Firm* — Michael C. Stephens, Jr.

(57) ABSTRACT

Power converter circuits, structures, and methods are disclosed herein. In one embodiment, a hybrid converter can include: (i) a first switching device controllable by a control signal; (ii) an inductor coupled to the first switching device and an output; and (iii) a control circuit configured to receive feedback from the output for generation of the control signal to control the first switching device, where the control circuit includes a first detection circuit configured to detect first and second output conditions, the control circuit being configured to operate the first switching device in a switch control in response to the control signal when the first output condition is detected, and to operate the first switching device in a linear control region when the second output condition is detected.

20 Claims, 10 Drawing Sheets

HYBRID POWER CONVERTER

CROSS REFERENCES TO RELATED APPLICATIONS

This application is a continuation of the following application, U.S. patent application Ser. No. 12/313,457, entitled. "HYBRID POWER CONVERTER," filed on Nov. 20, 2008, and which is hereby incorporated by reference as if it is set forth in full in this specification.

FIELD OF THE INVENTION

The present invention generally relates to the field of semiconductor devices. More specifically, embodiments of the present invention pertain to power converters.

BACKGROUND

Voltage regulators, such as DC-to-DC voltage converters, are used to provide stable voltage sources for various electronic systems. Efficient DC-to-DC converters are particularly needed for battery management in low power devices (e.g., laptop notebooks, cellular phones, etc.). A switching voltage regulator generates an output voltage by converting an input DC voltage into a high frequency chopped voltage, and then filtering the high frequency chopped voltage to generate the output DC voltage. Specifically, the switching regulator includes a switch for alternately coupling and decoupling an input DC voltage source (e.g., a battery) to a load (e.g., an integrated circuit (IC)). An output filter, typically including an inductor and a capacitor, may be coupled between the chopped input voltage and the load to filter the output, and thus provide the output DC voltage. A controller (e.g., a pulse width modulator, a pulse frequency modulator, etc.) can control the switch to maintain a substantially constant output DC voltage.

Another type of converter is a linear regulator, which is suitable for converters having relatively low input to output voltage differences, as well as in low power applications where the input to output voltage difference is high. In a step down application where the input voltage is much greater than the output voltage, a switching regulator typically has better efficiency than a linear regulator due to substantial power loss in the linear regulator. However, switching regulators may incur power losses associated with the various switching actions (e.g., power device transitions, driving loss, etc.). In addition, switching regulator control is typically more complicated than that of a linear regulator, thus consuming more quiescent power. Consequently, switching regulator efficiency can suffer under relatively light output conditions, and may become lower than a corresponding linear regulator.

SUMMARY

Embodiments of the present invention relate to hybrid switching and linear power supply regulators.

In one embodiment, a hybrid converter can include: (i) a first switching device controllable by a control signal; (ii) an inductor coupled to the first switching device and an output; and (iii) a control circuit configured to receive feedback from the output for generation of the control signal to control the first switching device, where the control circuit includes a first detection circuit configured to detect first and second output conditions, the control circuit being configured to operate the first switching device in a switch control region in response to the control signal when the first output condition is detected, and to operate the first switching device in a linear control region when the second output condition is detected.

In another embodiment, a method of controlling voltage regulation can include: (i) monitoring an output of a hybrid converter, the hybrid converter converting an input voltage to an output voltage, the monitored output providing feedback for regulating the output voltage; (ii) controlling a first switching device of the hybrid converter when a first output condition is detected by turning the first switching device on for a first time interval and off for a second time interval; and (iii) controlling the first switching device of the hybrid converter when a second output condition is detected by operating the first switching device in a linear region.

Embodiments of the present invention can advantageously provide an efficient power conversion supply regulator. Further, embodiments of the present invention can accommodate aspects of both switching regulators and linear regulators to allow for efficient power supply conversion over a relatively wide range of load conditions. These and other advantages of the present invention will become readily apparent from the detailed description of preferred embodiments below.

DETAILED DESCRIPTION

Figure 1A:
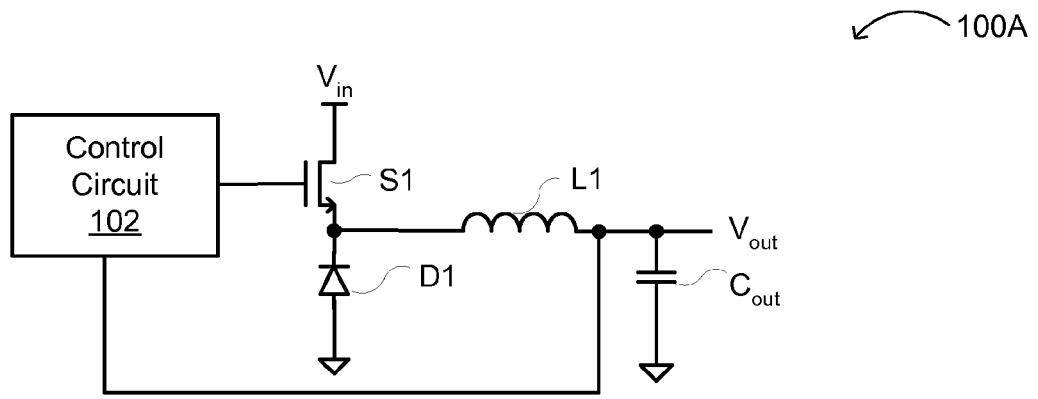
FIG. 1A is a block schematic diagram of an example switching regulator with a switching device buck topology.

Reference will now be made in detail to particular embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, processes, components, and circuits have not been described in detail so as not to unnecessarily obscure aspects of the present invention.

Some portions of the detailed descriptions which follow are presented in terms of processes, procedures, logic blocks, functional blocks, processing, schematic symbols, and/or other symbolic representations of operations on code, data bits, data streams, signals, or waveforms within a computer, processor, controller, device and/or memory. These descriptions and representations are generally used by those skilled in the data processing arts to effectively convey the substance of their work to others skilled in the art. A process, procedure, logic block, function, process, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like, and to their representations in computer programs or software as code (which may be object code, source code or binary code).

It should be borne in mind, however, that all of these and similar terms are associated with the appropriate physical quantities and/or signals, and are merely convenient labels applied to these quantities and/or signals. Unless specifically stated otherwise and/or as is apparent from the following discussions, it is appreciated that throughout the present application, discussions utilizing terms such as "processing," "operating," "computing," "calculating," "determining," "manipulating," "transforming" or the like, refer to the action and processes of a computer or data processing system, or similar processing device (e.g., an electrical, optical, or quantum computing or processing device or circuit), that manipulates and transforms data represented as physical (e.g., electronic) quantities. The terms refer to actions and processes of the processing devices that manipulate or transform physical quantities within the component(s) of a circuit, system or architecture (e.g., registers, memories, other such information storage, transmission or display devices, etc.) into other data similarly represented as physical quantities within other components of the same or a different system or architecture.

Furthermore, in the context of this application, the terms "wire," "wiring," "line," "signal," "conductor," and "bus" refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Light load efficiency in switching regulators may be improved in some cases by turning off a switching regulator for an extensive time during light output load conditions. A higher output level may support this occurrence, but the output may be substantially unregulated, followed by a drifting back into a regulated output range. However, relatively high output noise and relatively slow transient responses may result from certain operating conditions, such as during a transition from sleep mode to full power mode.

In one approach, a switching regulator and a linear regulator may be combined in parallel configuration, with an external control signal providing multiplexing between each regulator type. However, such a scheme can increase digital logic overhead and chip cost due to inclusion of an extra power device in the parallel linear regulator. Particular embodiments can include a hybrid topology and associated control scheme that operates a power converter in a switching mode under high load conditions, and operates the power converter in linear or a combination mode under light load conditions. In this fashion, high efficiency and low noise power conversion over a wide load range can be achieved.

Embodiments of the present invention can advantageously provide an efficient and low noise power conversion regulator. Further, embodiments of the present invention can accommodate aspects of both switching regulators and linear regulators in a hybrid configuration to allow for efficient power supply conversion. The invention, in its various aspects, will be explained in greater detail below with regard to exemplary embodiments.

Any suitable input and regulated output voltages can be accommodated in particular embodiments. For example, in a buck step down regulator, an input voltage can range from about 2.5 V to about 5.5 V, such as from about 2.7 to about 4.2 V, and including about 4.2 V. A regulated output voltage can range from about 0.8 V to abut 2.2 V, and including from about 1 V to about 1.8 V, and more specifically about 1.5 V. For example, some such voltages can apply in a cell phone application, and may be utilised for main chip power, random-access memory (RAM) power, or the like. Further, any suitable capacitance and inductance values can be accommodated in particular embodiments.

In particular embodiments, a hybrid topology and control scheme can operate a power converter in switching mode under high current load conditions, and operate the power converter in linear or a combination mode under light output load conditions. When in switching mode, the switching devices may be periodically turned off and on based on appropriate feedback-based controls. When in a linear operating mode, one switching device can operate in a linear region to act as a pass element of the linear regulator, and the other switch may be off. In a regulator configuration using two actively controlled switching devices, a second switching device may be turned off, or the second device may operate under a linear region to improve output transient responses. When in combination mode, one switching device can operate in a linear region, and another switching device can operate in a switching mode to improve output transient responses, as well as overall conversion efficiency.

Referring now to FIG. 1A, shown is a block schematic diagram 100A of an example switching regulator with a switching device buck topology. This example buck regulator circuit can include one actively controlled power switch S1, and one passive power device or rectifier D1. This type of regulator can be used to convert from a higher (e.g., about 19 V) to a lower (e.g., about 5 V) voltage. The active controlled (e.g., via control circuit 102) power switch S1 may be referred to as a "switch" or "switching device," and may be implemented as any suitable transistor (e.g., NMOS, PMOS, BJT, etc.), or the like.

In operation, when S1 turns on, current in inductor L1 may be increased and delivered to the output ($V_{out}$ across $C_{out}$). When S1 turns off, the current in inductor L1 may be decreased and the energy that is stored in inductor L1 during the S1 on state may be delivered to the output. When S1 is on, the conduction voltage drop on S1 may be relatively small (e.g., less than about 300 mV). When S1 is off, there may be no current in S1, and thus no power loss on S1. Further, the conduction voltage drop in a rectifier can be less than about 500 mV, such as when a Schottky rectifier is used. One drawback of this type of regulator is that a relatively high amount of energy can be used for turning on and off switch S1 because S1 may be a relatively large device.

Figure 1B:
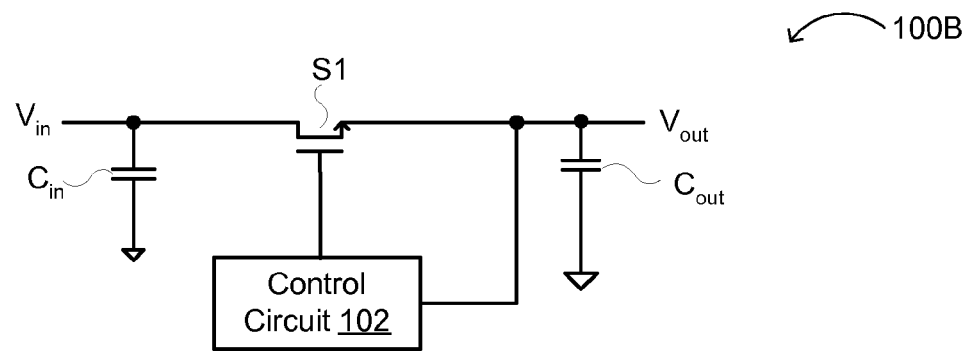
FIG. 1B is a block schematic diagram of an example linear regulator.

Referring now to FIG. 1B, shown is a block schematic diagram 100B of an example linear regulator. Here, a single power device S1 is used, and the conduction drop on S1 may be a difference between the input ($V_{in}$ across $C_{in}$) and output ($V_{out}$ across $C_{out}$) voltages. If the input and output voltage difference exceeds about 300 mV, resulting linear regulator efficiency tends to be lower than that of a corresponding switching regulator when other loss factors are neglected. However, this type of regulator may be suitable for low cost and low voltage difference applications (e.g., converting from about 1.8 V to about 1.5 V), as well as very light loads on the output node.

In today's switching regulator designs, high frequency operation can be accommodated to satisfy relatively low cost and small board size specifications. However, power losses associated with switching actions of a switch can be substantial. Such switching losses can include driving losses of a switch (e.g., switch S1), switching transition loss within the power switch itself, and magnetic core losses in the inductor (e.g., inductor L1). As a result, switching regulators tend to have relatively poor power conversion efficiency at very light load conditions, and in some cases may be lower than linear regulator efficiency.

As shown in the example power conversion topologies of FIGS. 1A and 1B, switching regulators have more power components than corresponding linear regulators. Thus if D1 is kept off at relatively light load conditions, S1 can be operated in a linear mode or region. To accomplish this, an additional linear regulator loop can be added.

An Exemplary Hybrid Converter

In one example, a hybrid converter can include: (i) a first switching device controllable by a first control signal; (ii) an inductor coupled to the first switching device and an output; and (iii) a control circuit configured to receive feedback from the output for generation of the control signal to control the first switching device, where the control circuit includes a first detection circuit configured to detect first and second output conditions, the control circuit being configured to operate the first switching device in a switch control region in response to the control signal when the first output condition is detected, and to operate the first switching device in a linear control region when the second output condition is detected.

Figure 2:
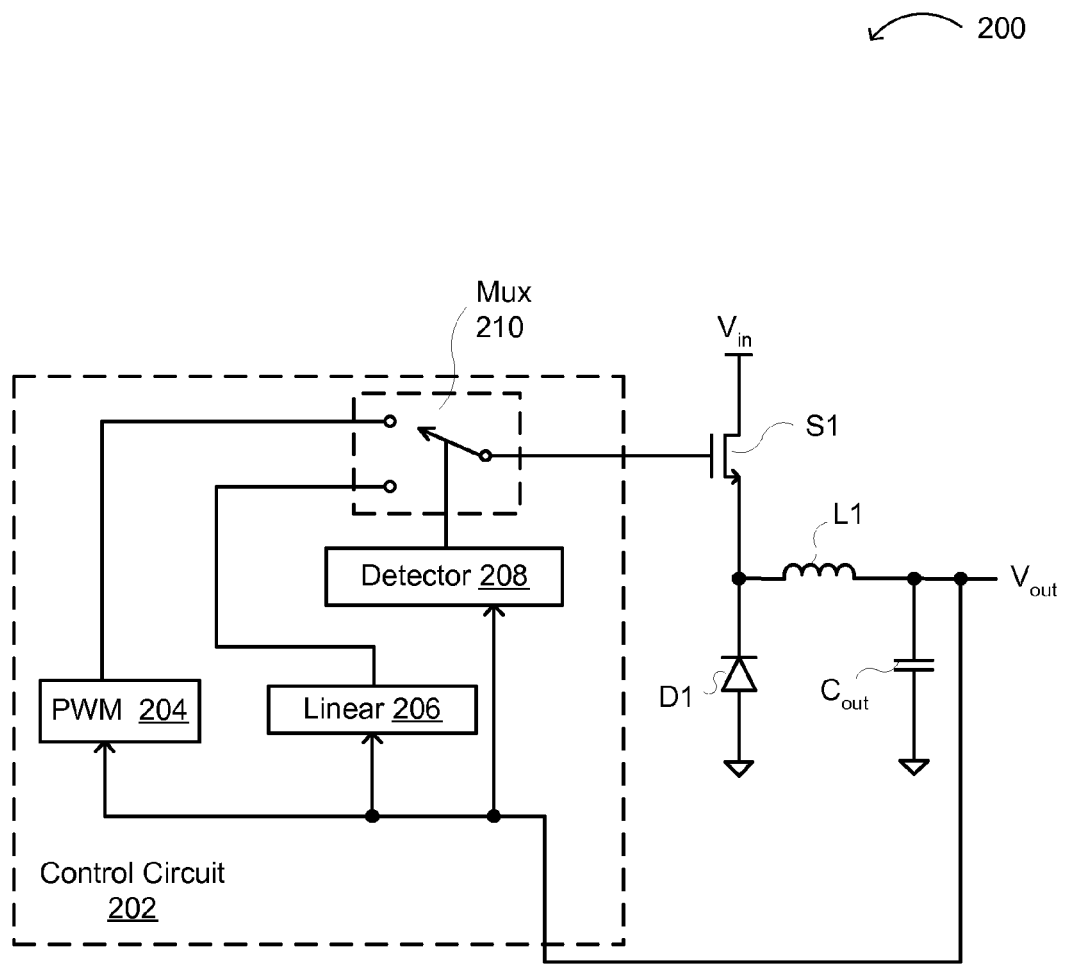
FIG. 2 is a block schematic diagram of a first example hybrid converter in accordance with embodiments of the present invention.

Referring now to FIG. 2, shown is a block schematic diagram 200 of a first example hybrid converter in accordance with embodiments of the present invention. Input voltage $V_{in}$ can be converted into output voltage $V_{out}$ across capacitor $C_{out}$ by using switch S1, inductor L1, and rectifier D1, with control of switch S1 being provided by control circuit 202. Detection circuit 208 can detect output conditions (e.g., current and/or voltage) to determine when to operate the circuit in a linear mode (e.g., via linear control circuit 206) and when to operate the circuit in a switching or pulse width modulation (PWM) mode. In particular embodiments, a light output load condition can cause multiplexer 210 to select linear circuit 206 control, and a heavy output load condition can cause multiplexer 210 to select PWM 204 control. For example, a light output load can be from about zero to about 10% of the maximum rated load. For example, a maximum rated load may be about 5 A, a light output load can be in a range of from about 0 mA to about 500 mA, while a heavy output load may be in a range of from about 500 mA to about 5 A.

Switch S1 can operate using control signals from PWM 204, with on and off control of transistor S1 being for predetermined intervals under heavy load conditions, and a linear mode operation under light load conditions. In addition to selection of suitable controls for switch 51 being passed via multiplexer 210, detection circuit 208 can also send signals to PWM 204 and/or linear control 206 to disable circuitry not in use based on particular output load conditions or mode of operation. In this fashion, circuit portions, such as PWM 204 when linear circuit 206 control is enabled for light output load operation or linear circuit 206 control when PWM 204 control is enabled for heavy output load operation, can be disabled when not in use to reduce power consumption. In addition, while control blocks PWM 204 and linear 206 are shown separately in this example, functional portions thereof can be merged together in certain embodiments.

Multiplexer 210 can be implemented as any suitable type of selection circuit (e.g., digital logic, NMOS and/or PMOS transistors, etc.). Also, inductor L1 can have any suitable inductance, such as from about 0.22 uH to about 22 uH. Further, capacitor $C_{out}$ can have any suitable capacitance, such as from about 4.7 uF to about 2000 uF.

Figure 3:
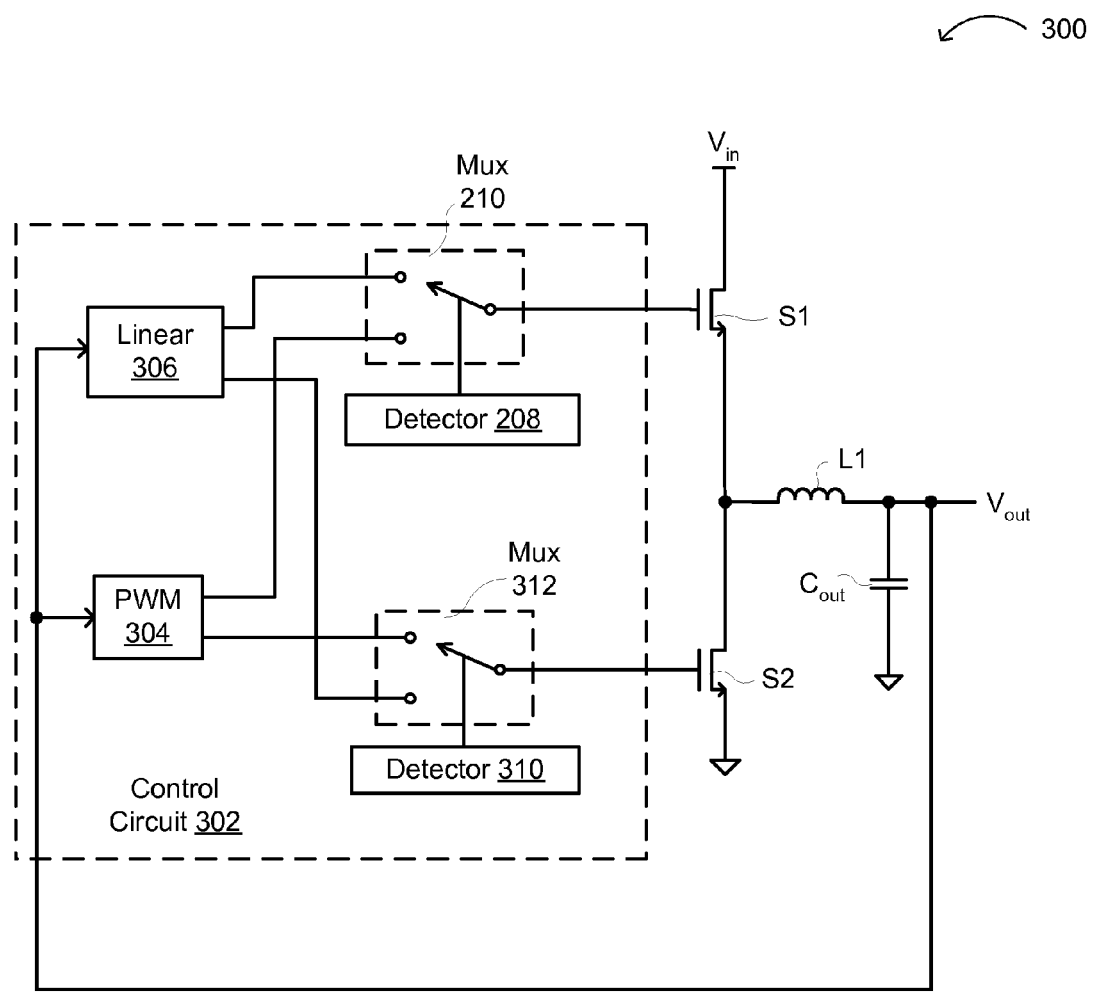
FIG. 3 is a block schematic diagram of a second example hybrid converter in accordance with embodiments of the present invention.

Referring now to FIG. 3, shown is a block schematic diagram 300 of a second example hybrid converter in accordance with embodiments of the present invention. Input voltage can be converted into regulated output voltage $V_{out}$ across $C_{out}$ using high side switch S1 and low side switch S2, and inductor L1, with control of switches S1 and S2 being provided by control circuit 302. In this particular example suitable for synchronous step down applications, a rectifier (e.g., D1 of FIG. 2) may be replaced by actively controlled MOS transistor switch S2. Detection circuits 208 and 310 can determine switching or linear mode operation based on detection of particular output conditions (e.g., based on voltage, current, etc.). Although circuits 208 and 310 are shown as distinct blocks with unique outputs, these circuits can share elements, and may have as few as one unique output in certain embodiments.

Under relatively heavy load conditions, switches S1 and S2 can switch in a substantially complementarily fashion according to one or more control signals from PWM modulator 304. Under relatively light load conditions, S1 can be controlled via detection circuit 208 and multiplexer 210 to operate in a linear mode. Switch S2 can enter linear mode via multiplexer 312 selecting a linear circuit 306 output in response to detection circuit 310, in order to increase output transient responses. Alternatively, S2 may be kept off to simplify control circuit design. For example, if S1 and S2 are to enter the linear mode or the switching mode simultaneously, detection circuits 208 and 310 may be combined into one detection circuit in particular embodiments.

Figure 4:
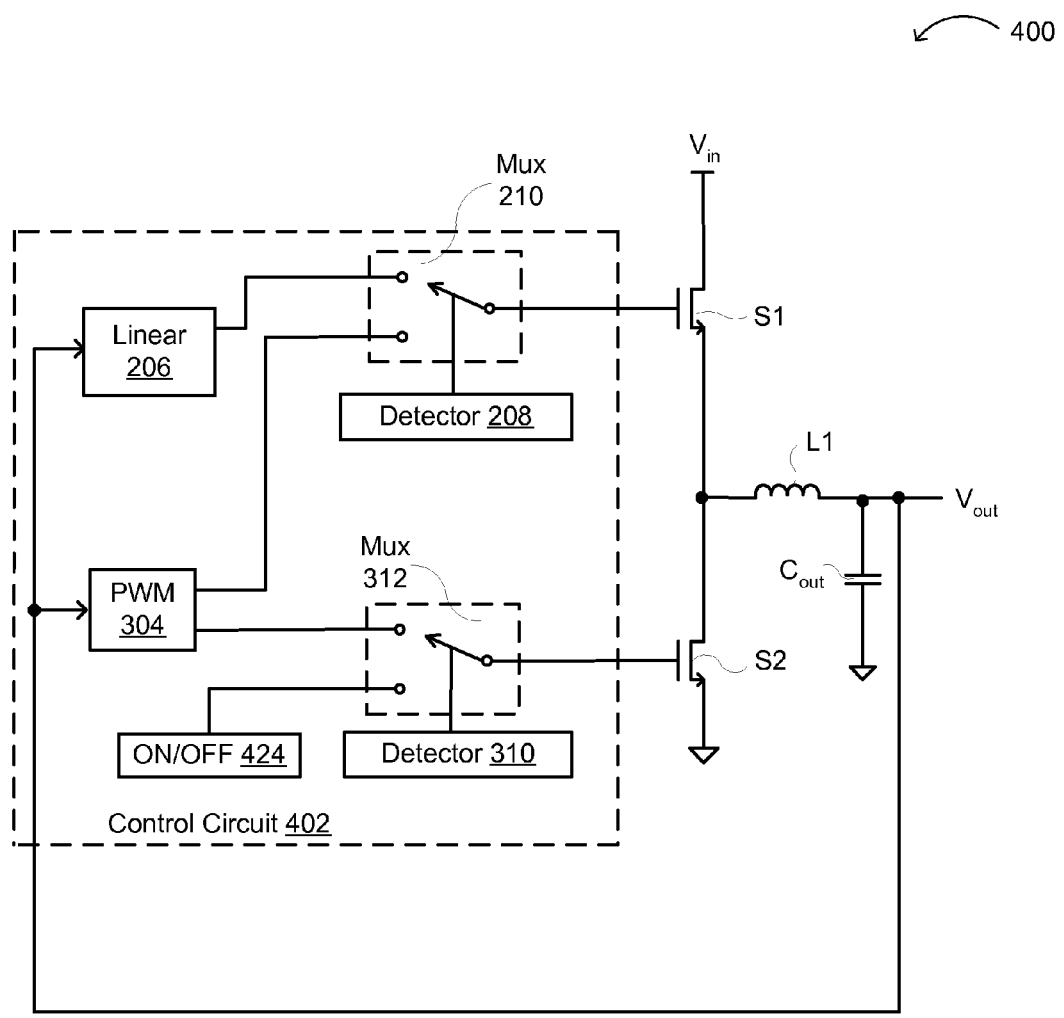
FIG. 4 is a block schematic diagram of a third example hybrid converter in accordance with embodiments of the present invention.

Referring now to FIG. 4, shown is a block schematic diagram 400 of a third example hybrid converter in accordance with embodiments of the present invention. Detection circuits 208 and 310 can determine switching or linear mode operation based on output conditions (e.g., voltage, current, etc.), and control corresponding multiplexers 210 and 312, respectively. In this example, control circuit 402 can include on/off control 424 in place of the linear control connection shown in FIG. 3.

Under relatively heavy load conditions, S1 and S2 can switch in a substantially complementarily fashion according to one or more control signals from PWM modulator 304. Under relatively light load conditions, S1 can be controlled via multiplexer 210 and linear control circuit 306 to operate in a linear region. Switch S2 can be turned off (e.g., via on/off control 424) until detection circuit 310 senses an output over-voltage condition. Switch S2 may then be turned on to discharge output capacitor $C_{out}$. In this fashion, transient output response speed can be increased without substantially increasing switch S1 linear regulator loop complexity.

Figure 5A:
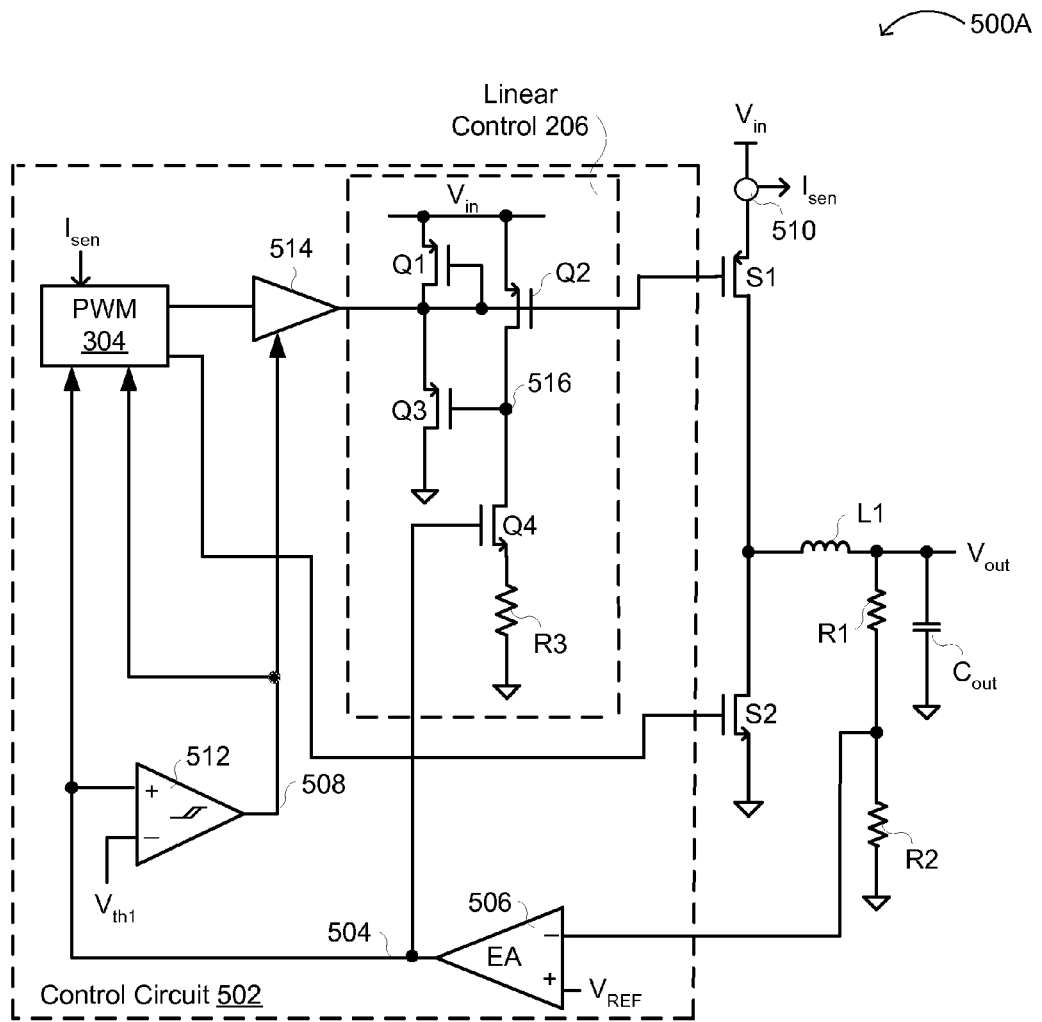
FIG. 5A is a block schematic diagram of a fourth example hybrid converter in accordance with embodiments of the present invention.

Referring now to FIG. 5A, shown is a block schematic diagram 500A of a fourth example hybrid converter in accordance with embodiments of the present invention. This example can represent a more detailed version of FIG. 2, thus control circuit 502 can include PWM modulator 304 and linear control 206. In this particular synchronous step down regulator configuration, high side switch S1 can operate in linear mode, while low side switch S2 remains off under relatively light load conditions.

In operation, output voltage $V_{out}$ can be sensed by feedback error amplifier (EA) 506 via resistor divider network R1 and R2. A voltage difference between a sensed output voltage and a reference voltage ($V_{REF}$) can be filtered and compensated to generate control node on signal 504. Control signal 504 may then be fed into comparator 512 to determine whether to enter a first output condition or a second output condition mode. Under a first output condition, node 508 from comparator 512 may be high to allow tri-state gate driver 514 to pass through an output from PWM generator 304 to drive switch S1 on and off periodically for normal switching mode operation. Under this switching mode operation, switch S2 may be turned on and off in substantially complementarily fashion relative to switch S1. In switching mode, signal 508 may be input into linear control 206 to allow the linear control block to be shut down in order to reduce power consumption.

Linear control 206 can include transistors Q1, Q2, Q3, and Q4, as well as resistor R3. Under the second output condition, node 508 from comparator 512 may be low, thus turning off tri-state control 514. At this point, linear control block 206 can take over gate drive for switch S1 to regulate the output ($V_{out}$) according to control signal 504 at the gate of transistor Q4. Transistors Q2 and S1 can be mirrored devices, and current in Q2 may thus be proportional to S1. When S1 provides too much current into the output, output voltage $V_{out}$ may rise, forcing control signal 504 to go low. This can increase a voltage at node 516, and thus increase a gate voltage of S1. Such an increased gate voltage can reduce current through S1 to achieve negative feedback control (e.g., via resistor network R1 and R2 and error amplifier 506). In some cases, in order to help stabilise the linear regulation loop due to output inductor L1, compensation components (e.g., EA 506) and gain can be adjusted to achieve good stability margin in linear mode.

Thus, control signal 504 can be used to convey to PWM 304 when to increase current via driver 514. For example, when $V_{out}$ is low because the output load consumes too much energy, control signal 504 is increased to cause high side switch S1 current (e.g., as detected by current sensor 510 to provide $I_{sen}$) to increase. In this fashion, control signal 504 indirectly reveals an output load condition. In addition, resistor values for resistors R1, R2, and R3, can range from, e.g., about 1 kΩ to about 1 MΩ.

Figure 5B:
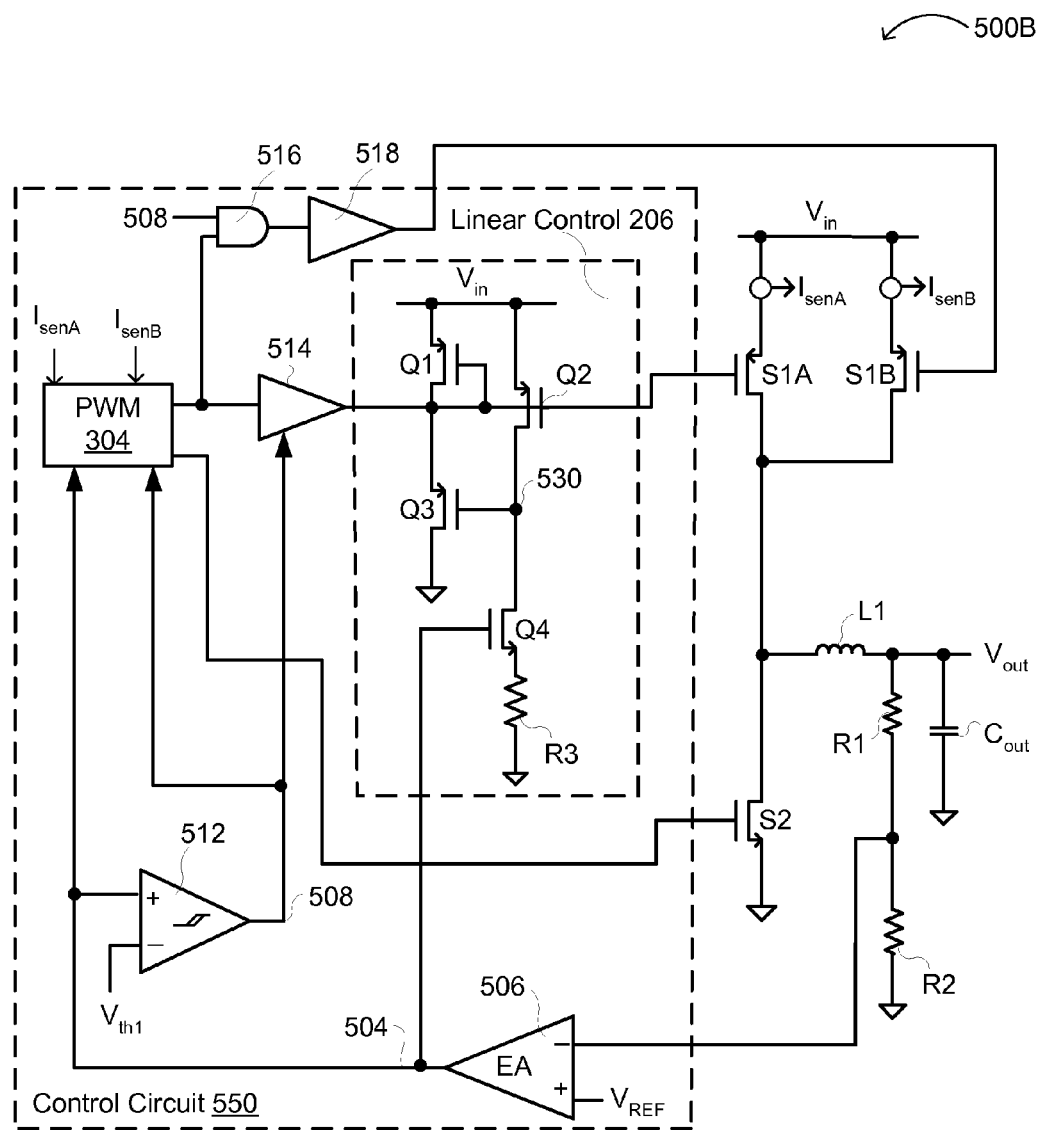
FIG. 5B is a block schematic diagram of an example variation of the circuit shown in FIG. 5A, in accordance with embodiments of the present invention.

Referring now to FIG. 5B, shown is a block schematic diagram 500B of an example variation of the circuit shown in FIG. 5A, in accordance with embodiments of the present invention. Here, the high side switch is divided into a number of parallel devices or parts, shown here as S1A and S1B. In this synchronous step down regulator configuration, part of high side switch S1B can turn off, and a remaining part S1A of the high side switch may operate in a linear mode, while low side switch S2 can remain off under light load conditions. The high side switch portion selection can be performed using digital logic, such as AND-gate 516 and driver 518, but other suitable circuitry can be used in certain embodiments. Under a second output condition, portion S1B can be turned off to facilitate loop stability for linear mode operation. Further, quiescent current consumed by control circuit 550 can be reduced using this approach.

Figure 6:
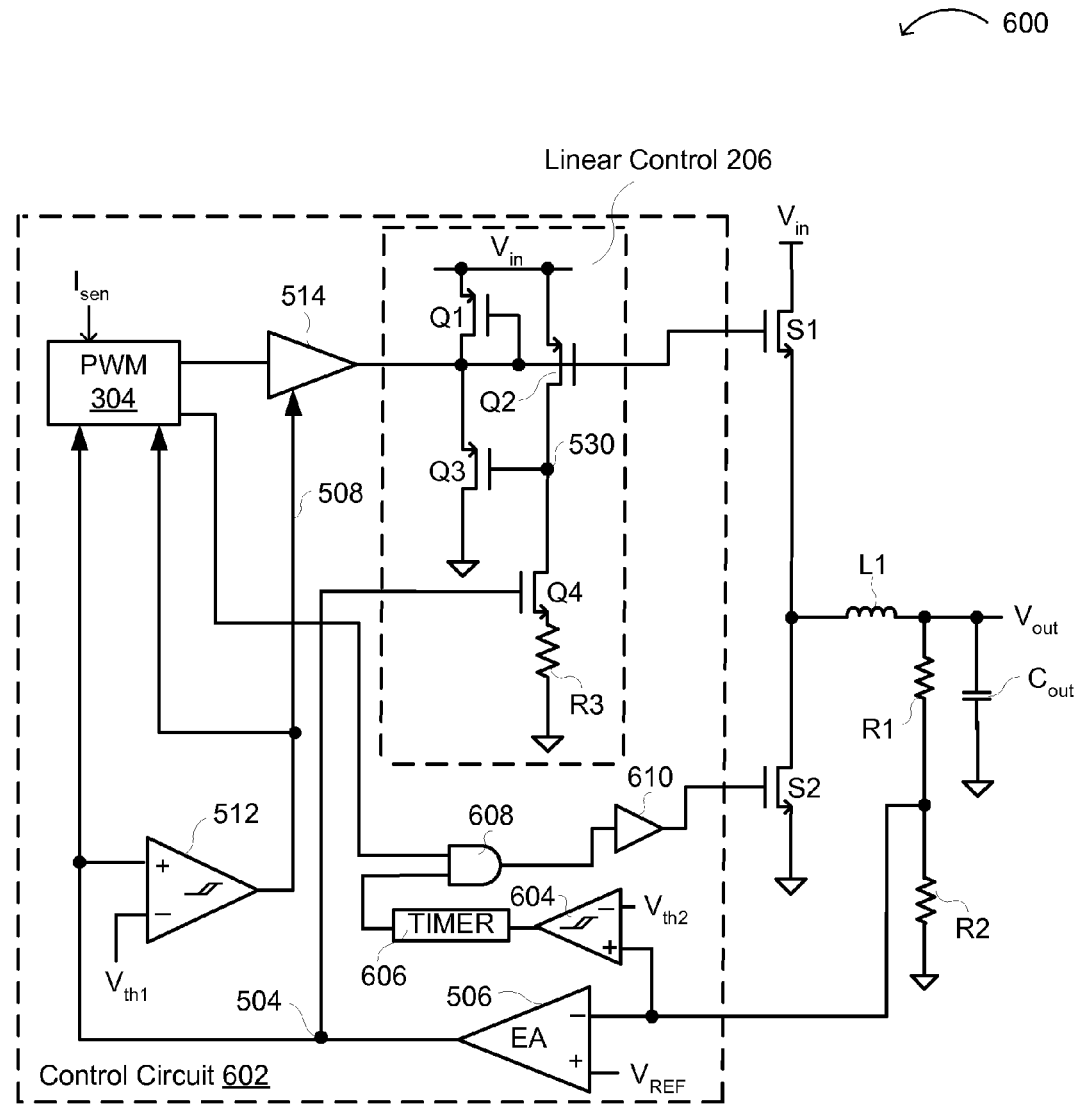
FIG. 6 is a block schematic diagram of a fifth example hybrid converter in accordance with embodiments of the present invention.

Referring now to FIG. 6, shown is a block schematic diagram 600 of a fifth example hybrid converter in accordance with embodiments of the present invention. In this synchronous step down converter configuration, under light load conditions, high side switch S1 can operate in a linear mode, and low side switch S2 can turn on and off in order to increase output transient response speed, and reduce output ripple. In this example, low side switch control can include over-voltage protection on the output by changing to on/off control from PWM 204 during such a condition (e.g., when an external influence causes $V_{out}$ to rise).

Under an output condition when S1 operates in a linear mode, good transient response may be difficult to obtain in some cases due to relatively large output inductance L1 (e.g., about 2.2 uH) when using the linear loop alone. Thus, switch S2 may be turned on and off based on an output voltage ($V_{out}$) condition, as determined via resistor divider network R1 and R2. In this particular example, switch S2 may be turned on for a fixed pulse duration generated by timer 606, which can be initiated by over-voltage comparator 604 providing a related output node comparison against a predetermined over-voltage threshold ($V_{th2}$). In certain embodiments, timer 606 may be optional, but may be adopted to limit a maximum negative inductor current under output over-voltage conditions.

For example, the on/off control 424 of FIG. 4 can include timer 606 and over-voltage comparator 604 of control circuit 602, and multiplexer 312 of FIG. 4 can include AND-gate 608 and driver 610 of control circuit 602. The output can be quickly discharged (e.g., in about 10 us) by inductor L1 and switch S2. During such operation, circuit performance can be greatly improved without substantially increasing complexity of the control circuitry. In addition, when high side switch S1 is in a linear mode, low side switch S2 can also be in the linear mode to configure a bi-directional linear regulator to speed up output transient responses.

Figure 7A:
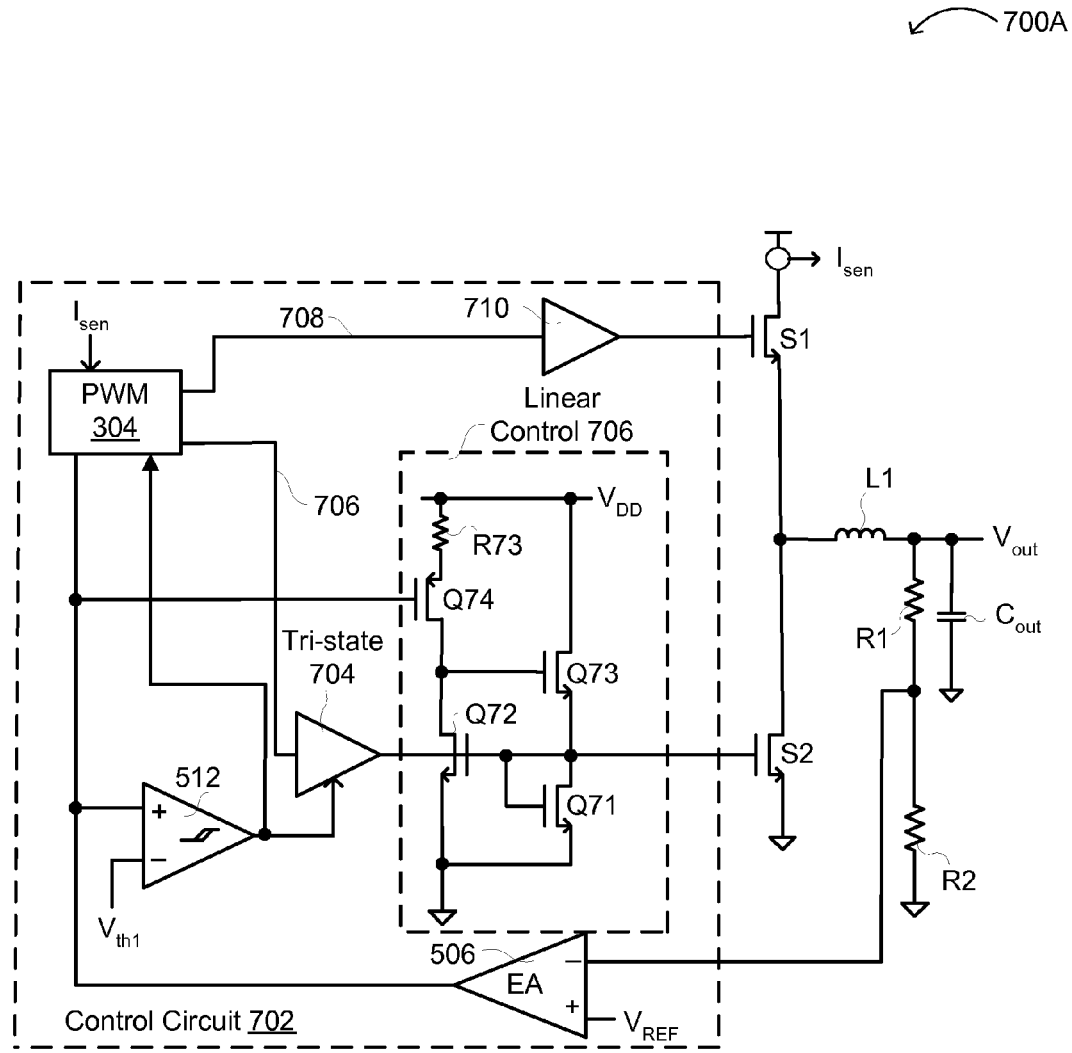
FIG. 7A is a block schematic diagram of a sixth example hybrid converter in accordance with embodiments of the present invention.

Referring now to FIG. 7A, shown is a block schematic diagram 700A of a sixth example hybrid converter in accordance with embodiments of the present invention. In this synchronous step down converter configuration, under light load conditions, high side switch S1 can remain off, and low side switch S2 can operate in the linear mode. Low side switch S2 may operate in a linear mode under a second output condition. Here, transistors Q71, Q72, Q73, and Q74, can be used, along with resistor R73, to form linear control 706 for linear control on the low switch side. Control circuit 702 can include PWM 304 control, as well as low side linear control 706 and tri-state control 704. Also, PWM modulator 204 can provide signal 708 to driver 710 for control of high side switch S1. This configuration is more attractive for a topology using an N-type MOS transistor for high side switch S1 because the linear control circuitry is simplified under light load conditions.

Figure 7B:
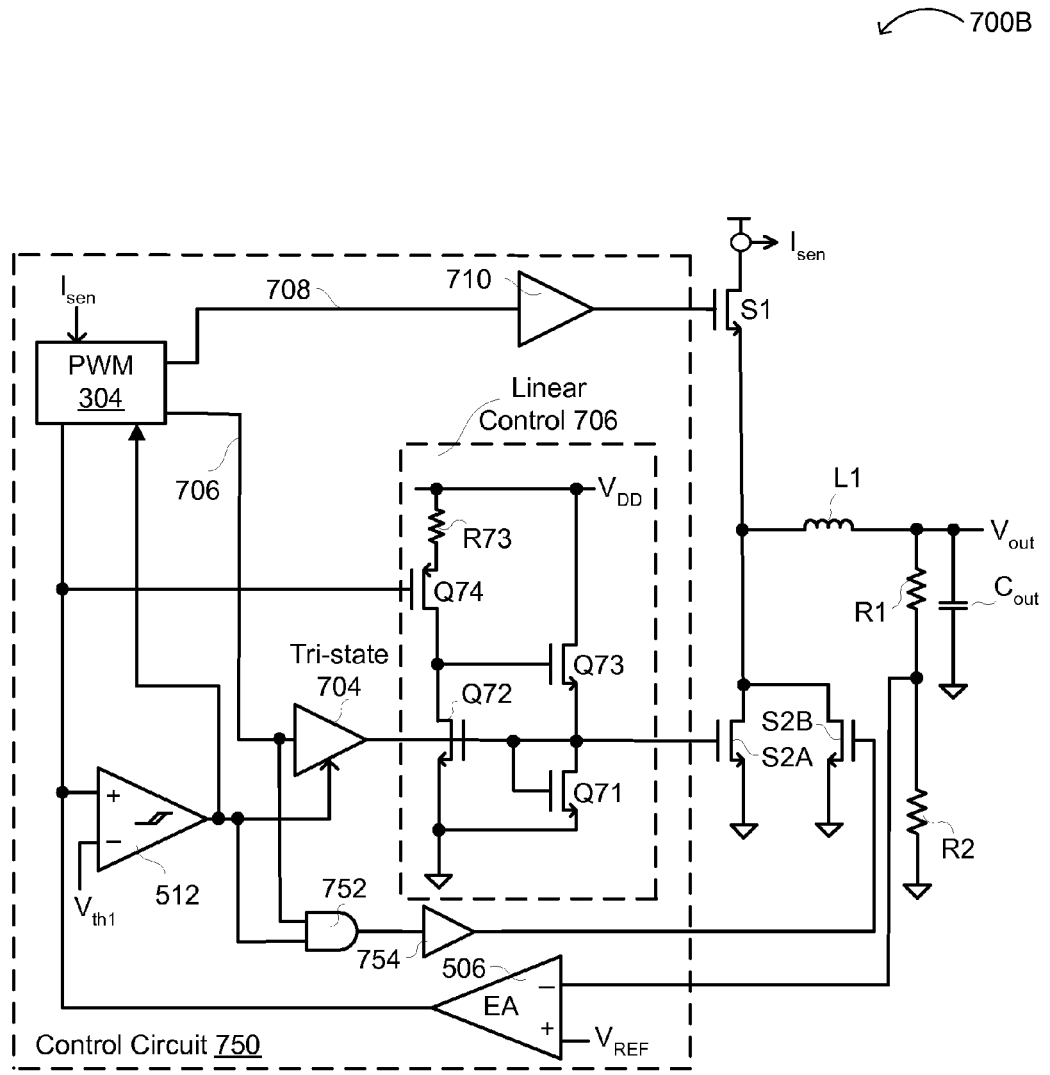
FIG. 7B is a block schematic diagram of an example variation of the circuit shown in FIG. 7A, in accordance with embodiments of the present invention.

Referring now to FIG. 7B, shown is a block schematic diagram 700B of an example variation of the circuit shown in FIG. 7A, in accordance with embodiments of the present invention. Here, the low side switch is divided into a number of parallel devices or parts, shown here as S2A and S2B. In this synchronous step down converter configuration, under light load conditions, high side switch S1, and part (e.g., S2B) of the low side switch can be held in an off state, and a remaining part (e.g., S2A) of the low side switch can operate in a linear mode. The low side switch portion selection can be performed using digital logic, such as AND-gate 752 and driver 754, but other suitable circuitry can be used in certain embodiments. Thus in this particular example, part (e.g., S2B) of the low side switch may be disabled in the second output condition, and a relatively small portion (e.g., S2A) of the low side switch can be operated in the linear mode. As a result, loop response speed can be increased, and quiescent current consumed by the control circuit can be reduced.

Exemplary Method of Controlling Voltage Regulation

In one example, a method of controlling voltage regulation can include: (i) monitoring an output of a hybrid converter, the hybrid converter converting an input voltage to an output voltage, the monitored output providing feedback for regulating the output voltage; (ii) controlling a first switching device of the hybrid converter when a first output condition is detected by turning the first switching device on for a first time interval and off for a second time interval; and (iii) controlling the first switching device of the hybrid converter when a second output condition is detected by operating the first switching device in a linear region.

Figure 8:
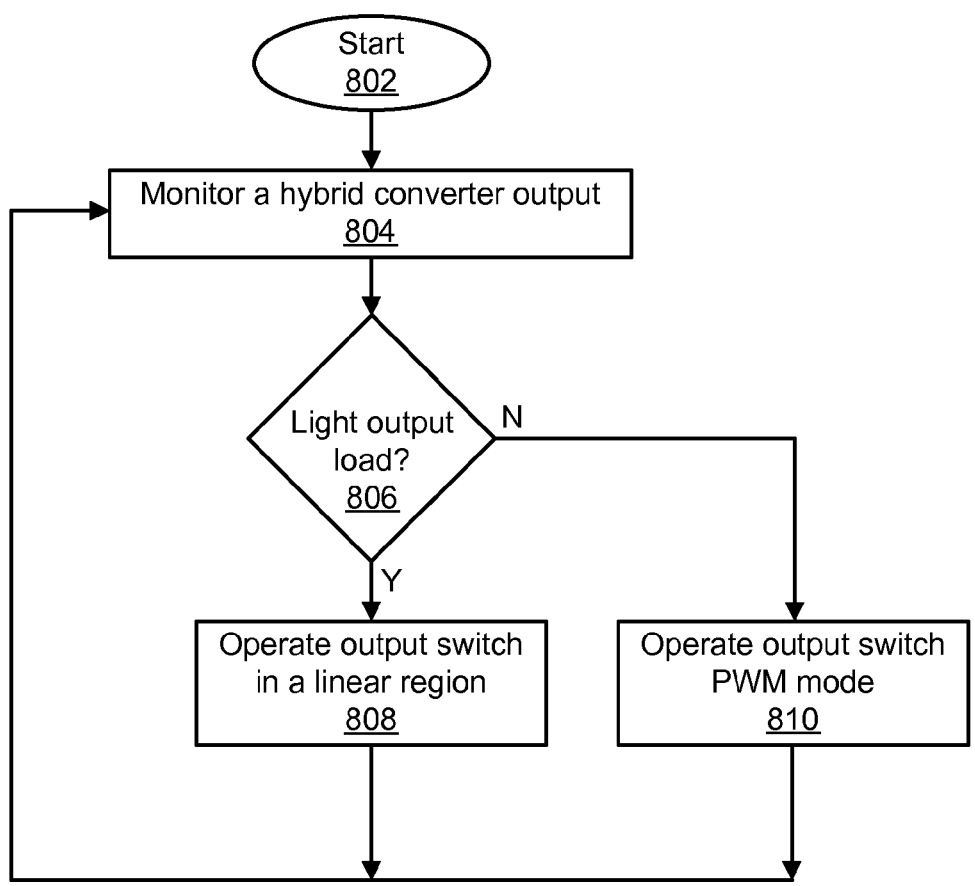
FIG. 8 is a flow diagram of an example method of power conversion using a hybrid topology in accordance with embodiments of the present invention.

Referring now to FIG. 8, shown is a flow diagram 800 of an example method of power conversion using a hybrid topology in accordance with embodiments of the present invention. The flow begins (802), and an output of a hybrid converter can be monitored (804). Such monitoring can include current and/or voltage monitoring, such as by using a resistor divider network coupled to an error amplifier. If a light output load condition is detected (806), an output switch (e.g., a high side NMOS transistor) can be operated in a linear region (808). On the other hand, if a heavy output load condition is detected, the output switch can be operated using a PWM modulator for on/off control (810).

While the above examples include circuit and structural implementations of switching regulators, one skilled in the art will recognize that other technologies and/or structures can be used in accordance with embodiments. Further, one skilled in the art will recognize that other device circuit arrangements, elements, and the like, may also be used in accordance with embodiments. For example, although the controllers described above can include a pulse width modulator, particular embodiments are also applicable to other modulation schemes, such as pulse frequency modulation. In addition, while regulators discussed herein include step down and synchronous step down configurations, particular embodiments are also applicable to other voltage regulator topologies, such as boost converters, synchronous boost converters, flyback, synchronous flyback, and other suitable topologies.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A hybrid converter configured to convert an input voltage into an output voltage that drives an external load, the hybrid converter comprising:
   a) a first switching device controllable by a first control signal;
   b) a second switching device controllable by a second control signal;
   c) an inductor coupled to said first and second switching devices and an output; and
   d) a control circuit configured to receive feedback from said output for detection of first and second output conditions and generation of said first and second control signals, wherein said control circuit is configured to operate said hybrid converter in a switching mode when said first output condition is detected, and to operate said hybrid converter in a linear mode or a combination mode based on a control mode of said hybrid converter when said second output condition is detected,
   e) wherein said combination mode comprises one of said first and second switching devices being configured to operate in said linear mode and another of said first and second switching devices being configured to operate in said switching mode.

2. The hybrid converter of claim 1, wherein said control circuit is configured to operate:
   a) said first and second switching devices in a switch control region when said first output condition is detected; and
   b) said first switching device in a linear control region, and said second switching device in said linear control region or an off state, when said second output condition is detected.

3. The hybrid converter of claim 1, wherein at least said first switching device operates in a linear control region when said hybrid converter operates in said linear mode, and wherein both of said first and second switching devices operate in a switch control region when said hybrid converter operates in said switching mode.

4. The hybrid converter of claim 1, wherein said control circuit comprises:
   a) a first detection circuit configured to determine an operating mode of said first switching device; and
   b) a second detection circuit configured to determine an operating mode of said second switching device, wherein said first and second detection circuits are combined into a single detection circuit based on said determined operating modes.

5. The hybrid converter of claim 2, wherein said control circuit is configured, when said second output condition is detected, to operate said second switching device in said off state when in a first control mode, and to operate said second switching device in said linear control region when in a second control mode.

6. The hybrid converter of claim 1, wherein said first output condition comprises a heavy output load and said second output condition comprises a light output load.

7. The hybrid converter of claim 6, wherein said light output load comprises an output load of less than about 10% of a maximum load current on said output.

8. The hybrid converter of claim 6, wherein said heavy output load comprises an output load of more than about 10% of a maximum load current on said output.

9. The hybrid converter of claim 1, wherein said first switching device comprises a plurality of parallel devices.

10. The hybrid converter of claim 9, wherein said control circuit is configured to operate said first switching device in on and off regions when said first output condition is detected, and to turn off a first number of said plurality of parallel devices of said first switching device, and to drive a remaining number of said plurality of parallel devices in said linear control region when said second output condition is detected.

11. The hybrid converter of claim 1, wherein said control circuit is configured for power savings to disable first circuit portions of said control circuit when said first output condition is detected, and to disable second circuit portions of said control circuit when said second output condition is detected.

12. The hybrid converter of claim 1, wherein said second switching device comprises a plurality of parallel devices.

13. The hybrid converter of claim 12, wherein said control circuit is configured to turn off a first number of said plurality of parallel devices of said second switching device, and to operate a remaining number of said plurality of parallel devices in said linear control region when said second output condition is detected.

14. The hybrid converter of claim 12, wherein said control circuit is configured to turn off a first number of said plurality of parallel devices of said second switching device, and to operate a remaining number of said plurality of parallel devices in said switch control region when said first output condition is detected.

15. A method of controlling voltage regulation, the method comprising:
 a) monitoring an output of a hybrid converter, said hybrid converter converting an input voltage to an output voltage using first and second switching devices, said monitored output providing feedback for regulating said output voltage;
 b) detecting first and second output conditions by said monitoring of said output;
 c) controlling said hybrid converter to operate in a switching mode when said first output condition is detected; and
 d) controlling said hybrid converter to operate in a linear mode or a combination mode based on a control mode of said hybrid converter when said second output condition is detected, wherein said combination mode comprises one of said first and second switching devices being configured to operate in said linear mode and another of said first and second switching devices being configured to operate in said switching mode.

16. The method of claim 15, wherein said controlling said hybrid converter to operate in said switching mode when said first output condition is detected comprises:
 a) operating a first switching device of said hybrid converter by turning said first switching device on for a first time interval and off for a second time interval; and
 b) operating a second switching device of said hybrid converter on and off complementary to said first switching device.

17. The method of claim 16, wherein said operation of said second switching device further comprises turning on said second switching device when said output voltage is above a predetermined threshold.

18. The method of claim 15, wherein said controlling said hybrid converter to operate in said linear mode or said combination mode when said second output condition is detected comprises:
 a) operating a first switching device of said hybrid converter in a linear control region; and
 b) operating a second switching device of said hybrid converter in said linear control region or in an off state.

19. The method of claim 18, wherein said operation of said second switching device further comprises controlling said second switching device in said linear control region when said output voltage is above a predetermined threshold.

20. A voltage conversion apparatus, comprising:
 a) means for monitoring an output of a hybrid converter for providing feedback for regulating a voltage on said output, wherein said hybrid converter comprises first and second switching devices;
 b) means for detecting first and second output conditions by said monitoring of said output;
 c) means for controlling said hybrid converter to operate in a switching mode when said first output condition is detected; and
 d) means for controlling said hybrid converter to operate in a linear mode or a combination mode based on a control mode of said hybrid converter when said second output condition is detected, wherein said combination mode comprises one of said first and second switching devices being configured to operate in said linear mode and another of said first and second switching devices being configured to operate in said switching mode.

* * * * *